Feb. 17, 1970   W. H. KLEINHENN   3,495,642
SELF-LOCKING THREADED INSERT
Filed July 15, 1968
FIG. 1
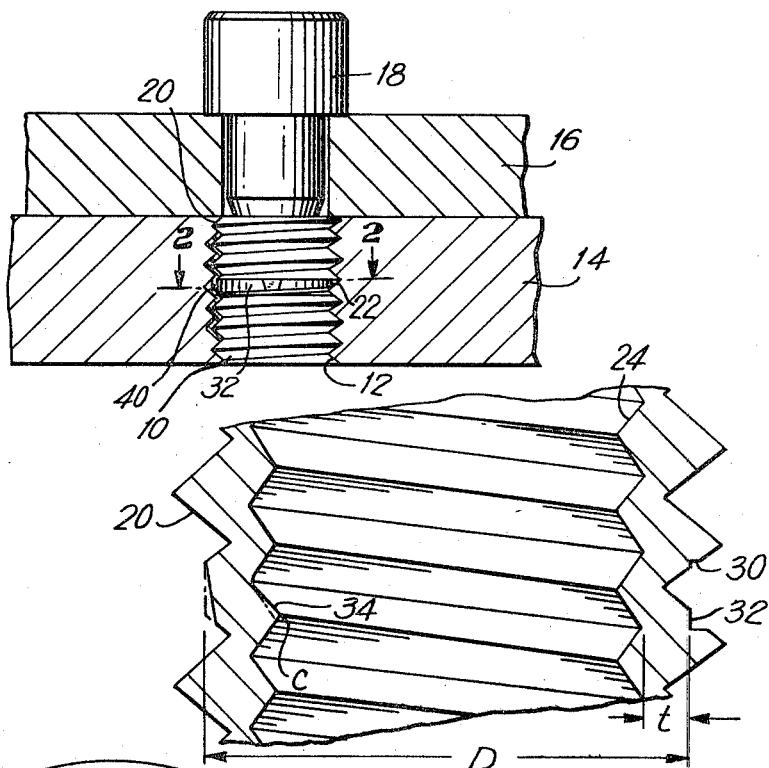
FIG. 2
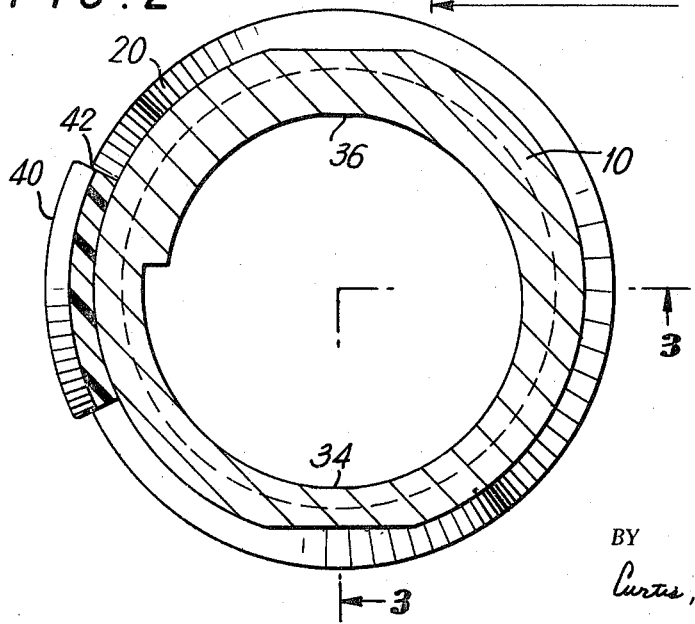
FIG. 3
INVENTOR.
WALTER H. KLEINHENN
BY
Curtis, Morris + Safford
ATTORNEYS

United States Patent Office 3,495,642
Patented Feb. 17, 1970

3,495,642
SELF-LOCKING THREADED INSERT
Walter H. Kleinhenn, Flourtown, Pa., assignor to Standard Pressed Steel Co., Jenkintown, Pa., a corporation of Pennsylvania
Filed July 15, 1968, Ser. No. 745,000
Int. Cl. F16b 39/28, 39/24
U.S. Cl. 151—21                                  9 Claims

ABSTRACT OF THE DISCLOSURE

An insert body having external threads to threadedly engage a receiving bore in a carrier member and internal threads to threadedly engage a stud member is provided with a self-locking feature for the stud member within the insert by machining a groove circumferentially around the insert and plastically deforming a portion of the grooved surface to inwardly deform the internal threads. Provision is also made to lock the insert body to the carrier member.

---

This invention relates to threaded inserts and more in particular to threaded inserts which are self-locking in an outer carrier part and also self-locking with a co-acting stud or bolt threaded therein.

Inserts of a hard material have commonly been used in applications wherein it is desired to fasten articles to a body of relatively soft or easily malleable material, such as aluminum, magnesium, or alloys of aluminum and magnesium, and the like, especially in cases where it is desired, or required, to remove or replace the article to be fastened. Repeated insertion and removal of the threaded fasteners in a threaded bore of such relatively soft material soon causes galling of the threaded bore, making it difficult to obtain a tight connection. Further, unless provision is made to lock both the insert to the relatively soft carrier material and the threaded stud or bolt within the insert itself there is a tendency for loosening of the bolt or the insert due to vibration in use. Further, to permit repeated use through a number of applications, it is necessary to provide an insert of simplified construction, preferably one piece construction, which has high self-locking retention capabilities.

There are many devices in the prior art which ostensibly provide for a threaded insert having a capability for self-locking both with respect to a malleable carrier member and also with respect to a threaded bolt or stud therein but many of these devices require multiple piece inserts including either separate locking elements, such as brads or retaining rings, or complicated machining techniques to either knurl or machine teeth into the threaded surface of the insert in order to provide a secure gripping surface.

It is therefore an object of the present invention to provide a self-locking, threaded insert of effectively one-piece construction which is securely retained within the carrier member and which also securely retains a threaded bolt or stud therein. It is a further object of the present invention to provide a self-locking, threaded insert which is economical and simple to manufacture and which is reusable through repeated applications without appreciable loss of locking function both within the malleable carrier member and also in retaining a stud or bolt.

In accordance with a preferred emobdiment of the present invention a cylindrical member of hard material is threaded both internally and externally and a groove is machined circumferentially around the external threaded portion of the insert at a depth equal to the pitch diameter of the external threads. A squeeze is applied at the groove, at a plurality of points, to plastically deform portions of the groove radially inwardly to deform the internal threads in this area thereby to provide a feature of self-locking relative to a bolt or stud which is subsequently threaded therein. A locking patch of thermoplastic material is bonded to the external threads of the insert and, thus, when the insert is threaded into a malleable carrier member, the locking patch forms a self-locking action between the threaded insert and the carrier member.

In the accompanying drawing:
FIGURE 1 is an elevational view, partly in section, showing a joint having the insert of the present invention and a bolt threaded therethrough;
FIGURE 2 is a sectional view taken on line 2—2 of FIGURE 1 and omitting the carrier member and bolt; and
FIGURE 3 is a vertical, sectional view taken on line 3—3 of FIGURE 2.

With reference to FIGURE 1 of the drawing, an insert 10 is engaged within a threaded bore 12 of a carrier member 14 and a plate member 16 is joined to the carrier member 14 by means of a threaded bolt or stud 18 which may be, for example, a socket-head cap screw. The insert 10 is preferably a cylindrical tubular member having a standard externally threaded surface 20 along its full extent, adapted to mate with an internally threaded surface 22 in the carrier member 14, and a standard internally threaded surface 24 along its full extent, adapted to co-act with the threaded shank (not shown) on the bolt 18. The insert 10 is preferably locked to the carrier member 14 to prevent relative rotation between the carrier member 14 and the insert during normal usage and, hence, is provided with means to lock the insert within the carrier member in such a manner that the insert may only be removed upon application of a breakaway torque in excess of any torque expected to be applied during designed use. In addition, an internal self-locking feature is provided to secure the threaded shank of bolt 18 and prevent relatve rotation between the bolt and the insert. Both of these self-locking features will be more fully described hereinbelow.

With reference to FIGURE 3, it is seen that the insert 10 is provided with a groove 30 around its circumference at a point approximately midway between its ends and parallel thereto. The groove 30 is machined into the insert to a depth which is approximately the pitch diameter of the external threads 20 (indicated at D in FIGURE 3) so that there is a flat ring 32 substantially at the pitch diameter completely around the insert. The insert is squeezed, at the ring 32, to plastically deform this portion of the insert radially inwardly, as at 34 and 36 (see FIGURE 2). The squeezing can be done at a number of locations around the ring depending upon the desired prevailing torque to be placed upon the stud coacting with the insert. In this manner, the deformed thread portions 34 and 36 extend radially inwardly into the insert and, when the threaded shank of the bolt 18 engages the inwardly squeezed portions 34 and 36, the bolt is engaged with a predetermined and preset prevailing torque to resist its rotation, for example in the opposite direction, to loosen the connection, and thus provide a self-locking action. Preferably, the deformation is located so that a crest C (FIGURE 2) of an internal thread is displaced from the position shown in broken line to the position shown in solid line so that a greater surface interference with a co-acting bolt is presented, thereby providing enhanced self-locking action. Additionally, the deformed portion is at an area of maximum insert thickness to provide greater strength and more resistance to outward displacement tending to destroy the self-locking action.

A patch 40 of thermoplastic material such as polyamide (nylon) is bonded to the external thread surface of the insert, as at 42, and provides a self-locking action when the insert is threaded into a carrier member. The break-away torque necessary to rotate the insert relative to the carrier member is of course much higher than the prevailing torque on the threaded bolt 18 in the insert and also much higher than the break-away torque required to disengage the bolt from the insert. Therefore, once the insert has been set in the carrier member, the rotation of the bolt into and out of the insert under the prevailing torque necessary to cause the bolt to engage and disengage the insert will not move the insert relative to the carrier member.

The groove 30, since it is cut only to the pitch diameter of the external threads of the insert 10, leaves a band of sufficient thickness (shown at $t$) around the insert for strength and flexibility. The thickness of the band $t$ enhances the reusability of the insert, particularly with respect to its self-locking characteristics. The indentations 34 and 36 are formed by plastically deforming the insert; but the thickness of the band $t$ is sufficient that although the insert expands slightly as the fastener 18 is engaged and disengaged, it is sufficiently resilient to return substantially to its original shape, thus prolonging the life of the self-locking insert by maintaining a more uniform prevailing torque on the fastener 18 through repeated cycles of use.

Prior art self-locking threaded inserts have been proposed for use in soft materials, such as wood, wherein the insert is of the self-threading type and includes a groove in the circumference of the insert which is machined to below the root diameter of the external threads. Such inserts, while effective for use in wood, where the joint is not subject to high pullout forces, are not acceptable where the joint would be subject to high stress loads and/or where there is a necessity for repeated applications. In comparison tests of inserts prepared in accordance with the present invention, i.e. the groove 30 for internal locking cut to the pitch diameter of the external threads, and similar inserts wherein the groove is cut to the root diameter of the external threads, it was found that, through a cycle of 15 applications, there was a significantly higher drop off in installation torque, i.e., prevailing torque, for the inserts with the groove cut to the root diameter, and the break-away torque necessary to loosen the bolt from the insert was also significantly lower. Further, when subjected to a pull test at various degrees of stud engagement the insert with the groove machined to the root diameter failed at significantly lighter loads.

A comparison of the measured values is illustrated in the tables below. The values shown were obtained using inserts having external threads to engage a ½–13 tapped hole in a 6061 aluminum test block with an internal thread to mate with a ⅜–16 socket-head cap screw.

TABLE II.—PULL OUT VALUES FOR INSERTS WITH CO-ACTING STUD

| Insert Type | Type Engagement | Pull Out Force (lbs.) | Type of Failure |
| --- | --- | --- | --- |
| Groove to root diameter. | Stud engaged completely beyond groove. | 13,400 | Insert split. |
| Groove to pitch diameter. | do | 14,300 | Threads in carrier member failed. |
| Groove to root diameter. | Stud engaged into groove one revolution. | 7,800 | Insert split. |
| Groove to pitch diameter. | do | 10,600 | Do. |
| Groove to root diameter. | Stud up to groove but not engaged. | 3,300 | Do. |
| Groove to pitch diameter. | do | 5,100 | Do. |

As is evident from Table I, the installation torque for the insert with a groove cut to the root diameter shows a marked reduction from the first to the fifth installation application and a significantly lower break-away torque after the fifteenth application. These results are indicative of significantly greater wear in the insert with the groove cut to the root diameter, which can be attributed to the radially outward plastic deformation of the indentations of the grooved area, due to the significantly thinner band of supporting material and thus both the installation torque values and the break-away torque values are significantly reduced after repeated application.

As seen from Table II, wherein are shown failure forces obtained from a pull out test, the pull out values for comparable stages of bolt engagement for the insert having the groove cut to the root diameter are significantly lower. In fact, where the bolt was fully engaged through the grooved locking portion, the failure for the insert with the groove to the pitch diameter was not in the insert itself but in the threads of the aluminum test block.

From the foregoing discussion and comparative test results, it is evident that a greatly improved self-locking insert has been developed which affords a greater reusability factor at acceptable prevailing torque values, long retention of self-locking action, ease of manufacture, and ease of use in that the insert, once provided with a bonded nylon tab on the external thread surfaces, is of one-piece construction for ready use in production line applications. Further, due to the increased strength afforded by the thickness of the locking band, the insert itself is of greater strength and able to withstand high stress loads without failure.

What is claimed is:
1. A self-locking threaded insert for mating coaction with a threaded bore in a carrier member comprising:
   a cylindrical body having an externally threaded surface along its full extent to engage in a mating thread surface in a carrier member,
   an internally threaded surface along its full extent to engage the threaded shank of a co-acting threaded fastener element,
   said insert having a circumferential groove spaced from each of its ends which is machined substantially to

TABLE I.—INSTALLATION AND BREAK-AWAY TORQUE VALUES FOR INSERTS WITH CO-ACTING STUD

| | Installation Torque (in.-lbs.) | | | | Break-away Torque (in.-lbs.) |
| --- | --- | --- | --- | --- | --- |
| | 1st Appln. | 5th Appln. | 10th Appln. | 15th Appln. | 15th Appln. |
| Inserts with groove to root diameter: | | | | | |
| #1 | 80 | 20 | 20 | 20 | 25 |
| #2 | 70 | 15 | 22 | 10 | 15 |
| #3 | 30 | 20 | 30 | 20 | 22 |
| Inserts with groove to pitch diameter: | | | | | |
| #1 | 72 | 35 | 32 | 35 | 32 |
| #2 | 60 | 34 | 30 | 42 | 32 |
| #3 | 68 | 42 | 48 | 48 | 50 | the pitch diameter of the external threads by cutting the crest height from the externally threaded surface down to substantially the pitch diameter, and at least one area on said groove, said area being substantially less than the perimeter of said groove, which is plastically deformed radially inwardly thereby to deform a portion of said internally threaded surface to provide a self-locking action in said threaded fastener element.

2. An insert as defined in claim 1 wherein said insert includes means to lock said insert to said carrier member thereby to prevent undesired relative movement of said insert and carrier member.

3. The insert as defined in claim 2 wherein said means to lock said insert to said carrier member includes a locking patch of thermoplastic material bonded to a portion of the external threaded surface of said insert.

4. The insert as defined in claim 1 wherein said groove is deformed at a plurality of areas thereby to deform said insert internal thread surface at a plurality of points to provide a self-locking action on a co-acting stud member.

5. The insert as defined in claim 1 wherein said plastic deformation is located so as to cause a crest of an internal thread of said insert to be displaced out of normal thread alignment thereby to provide an interference with a threaded fastener element threaded therein.

6. In a joint, a first member, a carrier member joined thereto, said first member having a bore therein to receive a threaded fastener element therethrough, said carrier member having a bore therein in axial alignment with said bore in said first member, said carrier member bore being threaded thereby to engage a cylindrical insert member having an externally threaded surface to mate with the internally threaded surface of said carrier member bore, said insert having an internally threaded surface to mate with the threaded surface of said threaded fastener element, the improvement comprising:

means on said insert to lock said insert within said carrier member thereby to prevent undesired relative movement between said insert and said carrier member, said insert including a circumferential groove spaced from each of its ends which is machined substantially to the pitch diameter of said insert external threads by cutting the crest height from the externally threaded surface down to substantially the pitch diameter and including at least one area on said groove, said area being substantially less than the perimeter of said groove, which is plastically deformed radially inwardly thereby to deform a portion of said insert internal threads to cause an interference with the threaded surface of said threaded fastener element therein, thereby to provide a self-locking action on said threaded fastener element.

7. The joint as defined in claim 6 wherein said means on said insert to lock said insert to said carrier member includes a locking patch of thermoplastic material bonded to a portion of the external thread surface of said insert.

8. The joint as defined in claim 6 wherein said groove is deformed at a plurality of areas thereby to deform said insert internal thread surface at a plurality of points to provide a self-locking action on a co-acting stud member.

9. The joint as defined in claim 6 wherein said plastic deformation is located so as to cause a crest of an internal thread of said insert to be displaced out of normal thread alignment thereby to provide an interference with a threaded fastener element threaded therein.

References Cited

UNITED STATES PATENTS

| 3,081,808 | 3/1963 | Rosan et al. | |
|---|---|---|---|
| 3,103,962 | 9/1963 | Neuschotz. | |
| 3,249,141 | 5/1966 | Neuschotz. | |
| 3,294,139 | 12/1966 | Preziosi | 151—7 |
| 3,334,365 | 8/1967 | Rosan et al. | |
| 3,391,721 | 7/1968 | Rosan | 151—22 |

MARION PARSONS, Jr., Primary Examiner

U.S. Cl. X.R.

151—7